US010120767B2

(12) United States Patent
Cherryholmes et al.

(10) Patent No.: US 10,120,767 B2
(45) Date of Patent: Nov. 6, 2018

(54) SYSTEM, METHOD, AND COMPUTER PROGRAM PRODUCT FOR CREATING A VIRTUAL DATABASE

(75) Inventors: Lon Jones Cherryholmes, Plano, TX (US); Chandrashekhar M. Vaidya, Sugar Land, TX (US); George Eddie Bailey, Jr., Houston, TX (US); Brett Hawton, Alamo, CA (US)

(73) Assignee: Idera, Inc., Houston, TX (US)

( * ) Notice: Subject to any disclaimer, the term of this patent is extended or adjusted under 35 U.S.C. 154(b) by 267 days.

(21) Appl. No.: 12/795,135

(22) Filed: Jun. 7, 2010

(65) Prior Publication Data
US 2011/0004586 A1 Jan. 6, 2011

Related U.S. Application Data

(60) Provisional application No. 61/225,596, filed on Jul. 15, 2009.

(51) Int. Cl.
*G06F 17/30* (2006.01)
*G06F 11/14* (2006.01)

(52) U.S. Cl.
CPC ...... *G06F 11/1469* (2013.01); *G06F 11/1471* (2013.01); *G06F 2201/80* (2013.01)

(58) Field of Classification Search
None
See application file for complete search history.

(56) References Cited

U.S. PATENT DOCUMENTS

| | | | |
|---|---|---|---|
| 7,266,656 B2* | 9/2007 | Chen et al. | 711/162 |
| 8,055,613 B1* | 11/2011 | Mu | G06F 17/30144 707/610 |
| 8,375,003 B1* | 2/2013 | Afonso et al. | 707/645 |

(Continued)

FOREIGN PATENT DOCUMENTS

EP          1503289 A2     2/2005

OTHER PUBLICATIONS

Cecchet et al., "C-JDBC User's Guide", Version 2.0, French National institute for research in Computer Science and Control (INRIA) Emic Networks, 2005.*

(Continued)

*Primary Examiner* — Aleksandr Kerzhner
*Assistant Examiner* — Eddy Cheung
(74) *Attorney, Agent, or Firm* — Park, Vaughan, Fleming & Dowler LLP

(57) ABSTRACT

A virtual database is attached to a server database management system ("DBMS") such that the DBMS believes it needs to recover the database to a last known point of consistency. In order to perform this recovery, the DBMS requests the transaction log file entries to be read from what it believes is the database's transaction log file. However, the requests are intercepted and translated into requests to read the transaction log portion of the backup file. The DBMS then uses the transaction log records to bring the database to a point of transactional consistency, unaware that the log records are actually being sourced from the backup file. All changes made to the data during the recovery phase and subsequent execution of any TSQL statements are routed into a cache file. Accordingly, a "virtual" database is created and used by the server DBMS engine as if it were a real database.

11 Claims, 5 Drawing Sheets

(56) References Cited

U.S. PATENT DOCUMENTS

| | | | |
|---|---|---|---|
| 8,453,145 B1* | 5/2013 | Naik | 718/1 |
| 2002/0103804 A1 | 8/2002 | Rothschild | |
| 2004/0083245 A1* | 4/2004 | Beeler, Jr. | 707/204 |
| 2006/0047713 A1* | 3/2006 | Gornshtein et al. | 707/202 |
| 2007/0022144 A1 | 1/2007 | Chen | |
| 2011/0093435 A1* | 4/2011 | Zha et al. | 707/639 |

OTHER PUBLICATIONS

Cecchet, "C-JDBC: A Middleware Framework for Database Clustering", Bulletin of the IEEE Computer Society Technical Committee on Data Engineering, vol. 27, No. 2, pp. 19-26, Jun. 2004, IEEE.*

Luetkehoelter, "Pro SQL Server Disaster Recovery", Chapter 2 "Making Database Backups", pp. 13-41, 2008, Apress.*

* cited by examiner

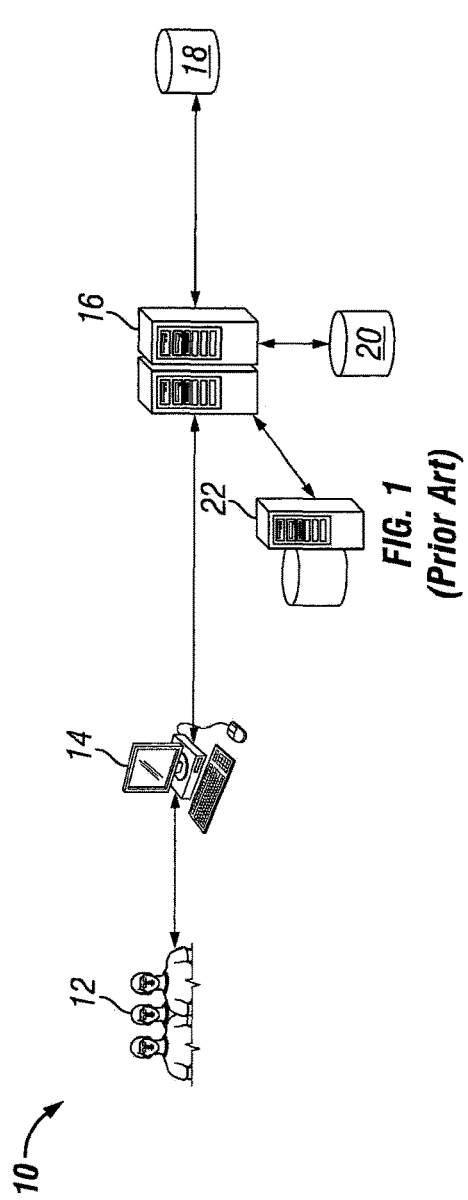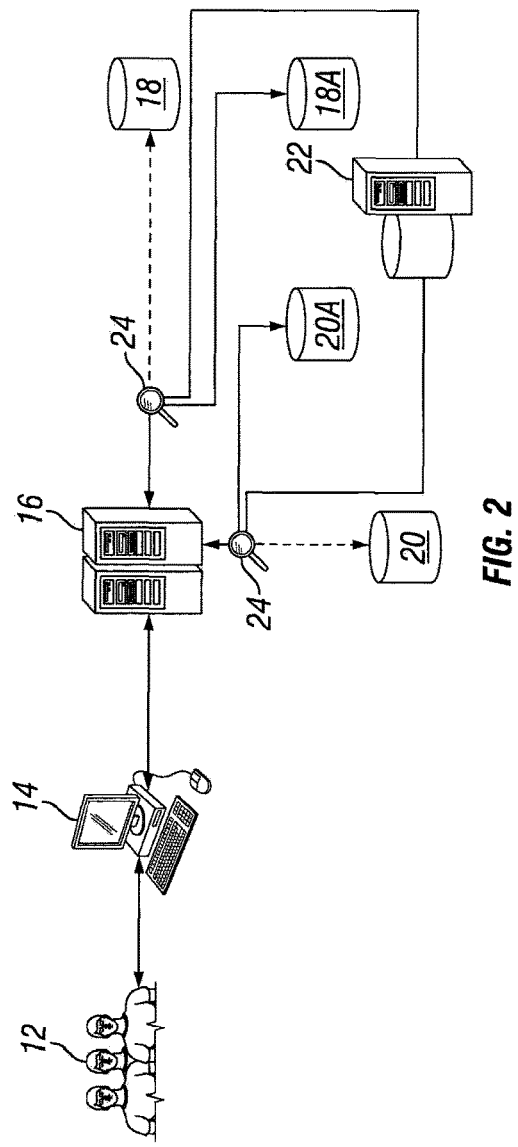
FIG. 1 (Prior Art)
FIG. 2

SYSTEM, METHOD, AND COMPUTER PROGRAM PRODUCT FOR CREATING A VIRTUAL DATABASE

CROSS-REFERENCE TO RELATED APPLICATIONS

This application claims the benefit of U.S. Provisional Application No. 61/225,596, filed on Jul. 15, 2009, entitled "METHOD FOR PERFORMING SQL VIRTUAL RECOVERY," which is hereby incorporated by reference in its entirety.

BACKGROUND OF THE INVENTION

Field of the Invention

The present invention relates generally to database recovery and, more particularly, to the creation of a virtual database whereby data recovery is achieved without the need to perform the costly steps associated with a database restore.

Description of the Related Art

In general, a computer database is implemented using files stored in a file system. The content of the database is found entirely within this set of files, also known as Database Data Files. The database can be copied or moved by simply transporting these Data Files. A Database becomes accessible when it is "attached" (or restored), and, accordingly, would be "detached" directly before it is moved again.

Two distinct types of data files are used to implement the database. The first, referred to as the Page Data Files ("PDF," either primary data files, aka MDF, or secondary data files, aka NDF) contains database pages organized in groups of eight pages called Page Extents. Each database page contains Records (i.e., Rows) which collectively contain all of the data and schema for both the database catalog and for the user.

The second type of data file is called a Log Data File ("LDF"), which contains multiple Virtual Log Files ("VLF") which in turn contain multiple log blocks. Each log block contains log records which collectively specify the information regarding every modification to the database through time. Sufficient information is stored in these log records to perform physical modifications to the database pages, therefore, enabling movement of the database forward through time during recovery.

In addition, there is enough information available in the log records to perform the physical modifications in reverse, undoing the action of that log record, and hence to move the Database backward through time. Multiple transactions, running simultaneously, serialize all of their physical modifications to the Database through one single continuum, called the Logical Log Sequence ("LLS"). The LLS is a sequential list of Logical Log Files ("LLF") which are temporarily contained within some VLF within the LDF, and ultimately contained within database backups. LLF and VLF are identical except in regards to the perspective by which they are viewed, the VLF being physical and the LLF being logical.

The PDF and LDF are very important in implementing the database, although in different ways. First, at any one instant in time, all data must be transactionally consistent, meaning that at that instant in time all the work of committed transactions has been applied, and any work of uncommitted transactions which might have been applied are undone. Once database recovery (making consistent the pages with this one instant in time of the LLS) is accomplished, the PDF is all that is needed and there is no further use of the LDF since only one instant in time is being represented.

Second, in regards to the passage of time, the LLS within the LDF is very important. For example, if the complete LLS, starting from the time of the database's creation, was available from backups and/or the live LDF, then all of the database pages within the PDF could be created using only this LLS. In this case, there would be no use of any specific PDF since we can represent them at any instant in time using the LLS.

Database backups are made periodically to save the data contained in both the PDF and LDF. These backups are critical to the correct operation of the database. Databases are typically restored for three primary reasons. First, the entire original data file of the database has been corrupted, lost or deleted. Second, when some data in the tables contained in the data file has been lost or altered in some way. In this case, typically the restore of the backup is not done to the original location, instead the restore is typically performed onto a second standby system and, after the restore is complete, standard Transact Structured Query Language ("TSQL") can be run against the standby database to extract the correct data which can then be applied against the original database. Third, when an external party (auditors/management or system engineers) wish to see that database data in a state at which it looked at sometime in the past. In this case, the backup is again restored to a standby system and used from there.

Accordingly, there are many different types of backups which are used in different ways during the restore process to bring a database online to a specific Point-in-Time ("PIT"). The most widely used backup types are Full Database Backup, Differential Database Backup, and Transaction Log Backup. A Full Database Backup contains all of the pages from the PDF that were allocated at the time the backup was begun, and the portion of the LLS from the LDF representing all of the required log records up to and including the finish of the backup process.

A Differential Database Backup contains all of the new or modified pages from the PDF since the time of the beginning of the most recent Full Database Backup, and the portion of the LLS from the LDF just the same as in a Full Database Backup. A Transaction Log Backup contains the portion of the LLS from the LDF which have been created since the previous Transaction Log Backup or, i.e., only the newer portion. After a successful backup operation, LLF are identified as no longer being needed and, thus, their corresponding containing VLF is marked appropriately for reuse for any newer LLF created in the future. In all types of backups, when the identified portion of the LLS in the LDF is written to the backup, it is at a granularity of log blocks, and hence most likely will contain an incomplete LLF at the beginning and end of the sequence, bracketing a sequence of complete LLFs in between.

The restore operation is used for several purposes. First, to make a copy of a database for testing or reporting purposes. Second, to recover from the disastrous effect of a mistaken action. Here, if you have an SQL database recovery model set to Full or Bulk-Logged, it is possible to restore from a Full Database Backup plus an optional number of Transaction Log Backups to a point in time. Therefore, in a data loss scenario for instance, you would take a backup of the transaction log or use those made recently, and restore a new copy of the database to a point in time just before the deletion. The missing data could then be copied from the restored copy of the database across to the live database. Third, to recover from a catastrophic failure like a power outage.

Conventional restore operations are costly in terms of both time and disk space. Time is often critical in a disaster-recovery or data-loss scenario. Limited availability of disk space often prevents the creation of necessary copies for testing/reporting and the restoration of some stored procedure or user table which was accidentally deleted. When using RESTORE for either of the first two purposes mentioned above, the time and space required to restore an entire database seems very wasteful. A copy of a database used for testing and/or reporting is only needed temporarily. Moreover, only a fraction of the entire database is actually required in a data loss scenario (e.g., usually a few tables or textual objects, or even just a single page).

It is important to understand the underlying steps taken during a restore operation. Consider the RESTORE DATABASE command used with a Full Database Backup, which can be used to either replace an existing set of data files for the specified Database using the "WITH REPLACE" clause, or it can newly create them. First, all the Page data (allocated Pages) within the Backup is copied to the PDF. Second, all of the Log Block data (i.e., LLS segments) within the Backup, is copied to their corresponding VLF within the LDF. Third, important bootstrapping information found within the configuration information in the Backup and other general bootstrapping information is written to the File Header Page of each Data File, and the Boot Page of the Primary PDF (MDF). Fourth, if the RESTORE command has the "WITH MOVE" clause, then pages in the MDF which are owned by the "sysfiles1" Table are modified and written to reflect the new path names of the Data Files. Finally, the RECOVERY phase is performed. During this restore process, most all of the time is spent in performing the copy phase, step 1 listed above. Accordingly, for large databases, it can take several hours to perform a restore operation.

It is important to understand the recovery phase performed as part of the restore operation, and to note that it is also performed as part of the attach operation. Recovery is performed as the final step in restoring a database from backups, when a database is attached or when the server starts (for example, after a crash). Recovery ensures that a database is transactionally consistent prior to bringing it online. As previously mentioned, if a database is transactionally consistent, all committed work is present and any uncommitted work has been undone.

In Microsoft® SQL Server™, recovery is based on write-ahead logging, which guarantees that changes are written to the log before the corresponding data pages are written. The log always defines the correct view of the database. Simply put, recovery is the process of making the data consistent with the transaction log at a given point in time.

It is also possible to perform a sequence of restore operations each using different backups to restore to a PIT. When there are multiple restore operations, all except the last is specified with the "WITH NORECOVERY" clause. The sequence must begin with a restore using a Full Database Backup, followed by an optional restore using a Differential Database Backup, and then a sequence of restores using Transaction Log Backups. The Full Database Backup will be the most recent previous one to the desired PIT. If present, the Differential Database Backup will be the most recent previous one to the PIT after the Full Database Backup has been used. The Transaction Log Backups will be in ascending chronological order up to the specified PIT, and starting from the Full (or Differential if present) Database Backup.

Several software products have been released surrounding backup and restore functionality by a handful of different software companies. These products offer a variety of mechanisms to utilize compression, which helps to reduce both the space and time required by backup and restore operations, and encryption, which helps to make the data secure.

Most of these backup/restore products also offer a feature which attempts to alleviate or eliminate the space and/or time required in a data loss scenario, and are offered as an alternative to performing a restore of the entire database just to extract some lost data or schema. The current vernacular used in the industry to reference this feature is Object-Level Restore or Object-Level Recovery ("OLR"). This name piggy-backs nicely to the concept of the File-Level Restore which has a granularity lower than a Database-Level Restore. The Object-Level then has a granularity lower than the File-Level. These objects can be either Tables (or Rows) containing actual data, or Schema which are textual objects containing the Data Definition Language ("DDL") subset of the TSQL language.

Currently, conventional OLR products widely used suffer from a major design flaw which severely limits their usefulness, and renders them generally unsuitable for their intended purpose. These tools only process the PDF data from the backup, and do not perform the proper recovery process using the LDF data from the backup (LLS segment). As such, the resulting data is highly suspect since the pages are not transactionally consistent. Therefore, these products will either crash, fail in mysterious ways, or quietly produce inconsistent data, i.e. garbage data. The OLR tools can only be used reliably in a very limited scope; if the backups being processed were produced while the database is offline, or in a single-user scenario where the operator knows that the database is quiescent for the duration of the backup process.

Moreover, some conventional backup/restore products offer the ability to query a Full Database Backup with SQL SELECT statements executed through Extended Stored Procedures or an Object Linking and Embedding Database Provider. However, these seemingly super-cool features are built using the faulty technology mentioned above, and hence are not generally useful because they unknowingly produce corrupted data.

It seems this faulty OLR and backup query technology could be fixed by having the software perform the necessary redo/undo of each page being referenced. However, in reality, this is an almost impossible task, due to its enormous complexity and the fact that these processes are undocumented and proprietary to the database management system ("DBMS") vendor.

Some DBMS software, such as Oracle's Flashback™ technology, offer a built-in mechanism within the DBMS, complete with additional SQL syntax, to support the ability to query databases specifying varying points in time from the past. This is implemented using a cache of rollback segments that are maintained specially by the user, then allowing the DBMS Engine to perform redo/undo (roll-forward and roll-back) on any loaded page during the query process. The disadvantage to such systems is the additional setup and configuration required. Also, the time range is limited by the size of the rollback segments.

Some DBMS software vendors offer a built-in online restore mechanism which also is insufficient because it is at the File or Filegroup Level and the data in those Files during this type of restore is unavailable. Not to mention overcoming the daunting task of reorganizing the entire database into multiple filegroups in some manner, which may or may not be beneficial from the online (but unavailable) restore.

One example of the before-mentioned systems is the Quest Software's Litespeed™ product where a special query tool has been written to expose the contents of a backup file. Simple, limited TSQL type queries can be written to extract data from the backup file and before that data is returned any transactions associated with it are applied. The disadvantage to this system is that it is not a database as recognized by the Microsoft SQL Server DBMS itself, and, hence, queries can only be run through a bespoke query tool. None of the conventional standard or third party tools, or applications can be used to extract information from the database.

Hyperbac Technologies' SQL Virtual Restore sends restore command to the SQL Server. When SQL Server is going through the copy phase of the restore, the Hyperbac SQL Virtual Restore intercepts the calls and writes it out to virtual files. SQL Server then does the recovery phase, where Hyperbac SQL Virtual Restore writes out the changes to the cache files. Subsequent requests for data are retrieved from the cache file or the backup. However, the disadvantage to this system is that during the copy phase of the restore, all of the pages in the backup file must be read, which is a time consuming process.

In view of the foregoing, there is a need in the art for, amongst others, a cost effective, reliable database recovery method using the LDF data from the backup, whereby the backup file's contents are immediately available for use by a server without the copy phase of a restore (where the PDF and LDF are first copied from the backup file) first having to take place.

SUMMARY OF THE INVENTION

Exemplary embodiments of the present invention provide systems, methods and computer program products to attach a database onto a server database management system ("DBMS"), such as a Microsoft SQL Server DBMS, such that the DBMS believes it needs to recover the database to a last known point of consistency. In order to perform this recovery, the DBMS requests the transaction log file entries to be read from what it believes is the database's transaction log file. However, with the present invention, these requests for log pages from the transaction log file are intercepted and translated (unbeknownst to the server DBMS) instead into requests to read the transaction log portion of the backup file. The DBMS then uses the transaction log records provided to perform a roll back and roll forward in order to get the database to a point of transactional consistency, unaware that the log records are actually being sourced from the transaction log portion of the backup file instead of from a physical transaction log file. All changes made by SQL Server to the data during the recovery phase and later during the execution of any TSQL statements which insert, update, or delete data are not routed to the backup file. Instead, all changes are captured and routed into a cache file (cache files exists both for the data and log files). Accordingly, a "virtual" database is created and used by SQL Server DBMS engine as if it were a real database.

BRIEF DESCRIPTION OF THE DRAWINGS

FIG. 1 illustrates a conventional database network according to the prior art;

FIG. 2 illustrates a database network according to an exemplary embodiment of the present invention;

Figure 3:
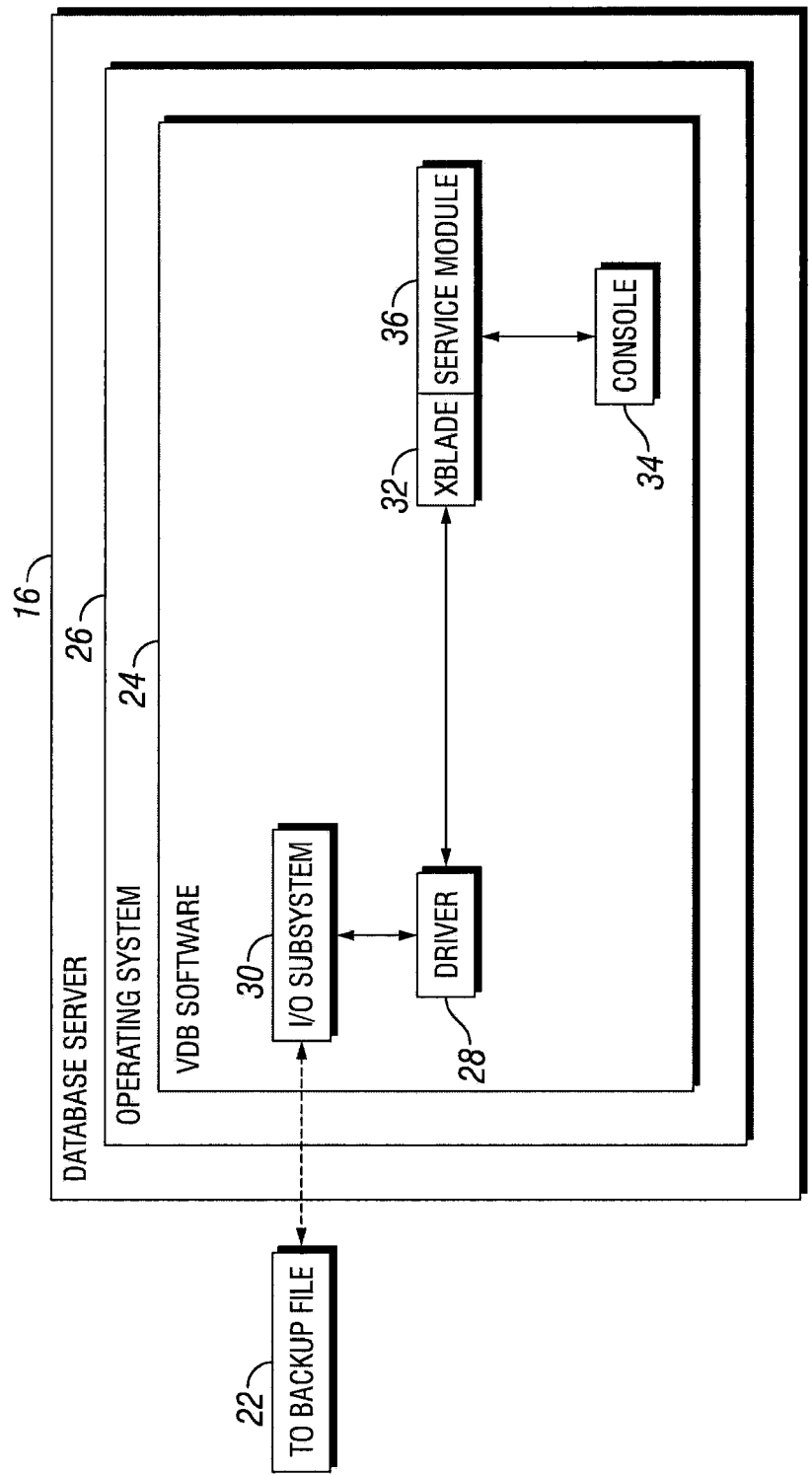
FIG. 3 illustrates the software architecture of a database server according to an exemplary embodiment of the present invention.

While the invention is susceptible to various modifications and alternative forms, specific embodiments have been shown by way of example in the drawings and will be described in detail herein. However, it should be understood that the invention is not intended to be limited to the particular forms disclosed. Rather, the intention is to cover all modifications, equivalents and alternatives falling within the spirit and scope of the invention as defined by the appended claims.

DESCRIPTION OF PREFERRED EMBODIMENTS

Illustrative embodiments and related methods of the invention are described below as they might be employed in virtual server recovery. In the interest of clarity, not all features of an actual implementation are described in this specification. It will of course be appreciated that in the development of any such actual embodiment or methodology, numerous implementation-specific decisions must be made to achieve the developers' specific goals, which will vary from one implementation to another. Moreover, it will be appreciated that such a development effort might be complex and time-consuming, but would nevertheless be a routine undertaking for those of ordinary skill in the art having the benefit of this disclosure. Further aspects and advantages of the various embodiments, methods and computer program products of the invention will become apparent from consideration of the following description and drawings.

Embodiments of the invention will now be described with reference to the accompanying figures. Like numbers refer to like elements throughout.

FIG. 1 illustrates a database communications network 10 according to the prior art, in which users 12 may run a variety of applications on personal computers ("PC") 14. PC 14 communicates with database server 16 via a bi-directional communication link as illustrated. Database server 16 may be located at the user site or remotely, as understood in the art. In relation to this specification, unless otherwise indicated, all communication links are bi-directional and may be wired or wireless, as understood in the art.

Various applications may be run on PC 14. These applications submit Transact Structured Query Language ("TSQL") commands to database server 16 in order to transmit and receive data the applications requires. Database server 16 includes a memory disk which stores data files 18 (containing data pages) and log files 20 (containing log records). However, data files 18 and log files 20 may also be stored on a disk remotely. Data file 18 is used to store information, such as a list of bank account holders and their associated balances. Log file 20 contains data which details all changes to database server 16 made since the last data backup. The primary role of log file 20 is to recreate the database data should it become corrupted.

Referring to FIG. 1, a conventional bank transaction via network 10 will now be described. A user 12 logs onto his banking account via PC 14 and transfers money to account B (not shown). The banking web application instructs database server 16, via a series of TSQL commands encapsulated in a single transaction, to subtract X dollars from the account of user 12 and to add X dollars to account B simultaneously. The entire task (subtracting/adding) must be accomplished contemporaneously so that both the adding and subtracting are accomplished together or, if some problem arises, neither occurs. Thus, a single transaction is used to perform both actions or neither action if there is some problem.

Database server 16 then reads the balances of both the account of user 12 and account B. Each account is then adjusted to reflect the new balances. When the transaction is completed, the changes do not have to be written back to data file 18 immediately, as log file 20 already has the changes saved. The data changes are typically written back to data file 18 at some later time.

Further referring to FIG. 1, during a backup process for our banking example above, backup file 22 is utilized. Here, the current contents of both the data file 18 and log file 20 are written out to the destination file of the backup file 22. The data file portion of the backup file 22 may still show the accounts of user 12 and account B prior to the money transfer. However, the log file portion of the backup file 22 has the log records to show that the two accounts have been adjusted.

Next, the restore process begins. Here, the current contents of both the data file portions and log file portions are read from backup file 22 and transmitted unchanged to the data file 18 and log file 20. The restore will replace the data in data file 18 with the contents of the data file portion of the backup file 22 transmitted from backup file 22. At this point in the restore process, both the account of user 12 and account B may still reflect their original balances before the transfer was made. The data in log file 20 is replaced with the log file data from backup file 22 which still reflects the subtraction/addition of the accounts.

Hereafter, transactional consistency is performed. Database server 16 reads the updated data in log file 20 from the last checkpoint including the results of completed transactions (including the money transfer). The log record changes are then applied to the data file 18 and the accounts balances are reflected accordingly. The restore is now complete and data file 18 now reflects the correct final values in both the account of user 12 and account B as at the point at which the database backup was complete.

General System Overview.

Referring to FIG. 2, an exemplary embodiment of the present invention will now be described. FIG. 2 is identical to FIG. 1, except the location of backup file 22 has been repositioned and virtual database software ("VDB") 24, according to an exemplary embodiment of the present invention, has been installed onto database server 16. Also, in this exemplary embodiment, database server 16 is a Microsoft® SQL Server™. VDB software 24 described herein may be recorded on a computer-readable recording medium such as a CD-ROM, a floppy disk, or a digital versatile disc (DVD), in an installable or executable file format. Thereafter, VDB software 24 may be read out from the recording medium on database server 16 and loaded on a main memory to be executed, whereby the respective modules of VDB software 24 are realized on the main memory.

Here, as in our previous example, user 12 initiates a transaction via PC 14, which submits a TSQL command to database server 16 to retrieve data. Once database server 16 receives the money transfer request, it initiates retrieval of the data from data file 18 and log file 20. However, VDB software 24, installed on server 16, intercepts the request, remaps and reroutes it instead to the corresponding data location in the backup file 22. Those ordinarily skilled in the art having the benefit of this disclosure realize there are a variety of interception methods such as, for example, an operating system filter driver/API detours etc.

During the interception, however, database server 16 still thinks it is calling data file 18 and log file 20, As such, the present invention creates a new database instance on database server 16 using the data contained in backup file 22. Server 16 is unaware the new "virtual" database's data and logs are initially being primarily sourced from the backup file 22 and, hence, allows user 12 to immediately use the virtual database as if it was a normal database. Therefore, the data in backup file 22 is immediately available for use by database server 16 without a restore copy phase first having to take place.

Referring to FIG. 3, the software architecture of database server 16 is illustrated according to an exemplary embodiment of the present invention. In terms of basic hardware architecture, database server 16 is a Microsoft® SQL Server™ including one or more processors in a processor core and a suitable amount of addressable memory as understood in the art. Database server 16 also includes operating system ("OS") 26, such as one of the many Windows® programs from Microsoft Corporation. Database server 16 also includes a network communication protocol layer (not shown) that implements the necessary functions for communication over network 10, as understood in the art.

Database server 16 further includes VDB software 24 according to an exemplary embodiment of the present invention. VDB software 24 may be located on database server 16 or located at a remote location. VDB software 24 comprises a console 34, service module 36 and an I/O filter driver/message interrecptor 28. Filter driver 28 sits at a low level monitoring disk I/O requests made by database server 16. In this embodiment, there can only be one instance of the filter driver 28 on the target database server 16.

Console 34 is utilized to call service module 36 to attach the back up file on server 22 as a virtual database, manage the virtual database, and configure and monitor the virtual database. Service module 36 specifies files with special extensions when it attaches the backup file on server 22 as a virtual database. The special extensions are "mxf" for "mdf" files, and "lxf" for "ldf" files. Filter driver 28 registers callbacks for specific file I/O operations like create, read, write, etc.

Filter driver 28 is started and attached to a specific volume. When the backup file on server 22 (i.e., virtual database) is attached by the service module 36, the file paths contain the specific volume to which the filter driver 28 is attached. The driver callbacks are only called for those I/O operations that belong to the attached volume. By default the installation attaches the filter driver 28 to the default volume, for e.g. C$. Console 34 can be used to change the volume to which the filter driver 28 is attached, as understood by those skilled in the art having the benefit of this disclosure. This allows a user to attach filter driver 28 to a non-busy volume to improve performance.

Filter driver 28 registers callbacks for the following I/O operations: Create, Set Information, Query Information, Read, Write, Cleanup, Flush Buffers, and Close. The I/O subsystem 30 invokes the driver callback if it is registered for the I/O operation. If the file has a virtual database file extension, filter driver 28 calls service module 36 to process the request. Filter driver 28 completes the I/O request and returns any associated data to the I/O subsystem 30. If it is not a virtual database file the callback returns, and I/O subsystem 30 continues to process the request.

The driver CREATE callback operation attaches a custom context to the file handle. The custom context contains a handle that has been assigned to the virtual database file by service module 36. During subsequent I/O operations, the callbacks look for the custom context to determine if it is a virtual database file.

Service module 36 is installed on the target SQL Server computer (e.g., database server 16). In this exemplary embodiment, there can only be one instance of service module 36 running on database server 16. Service module 36 provides the following functionality: (1) provide methods used by the console 34 to select backups, attach backups as a virtual database, detach a virtual database, configure VDB 24, and monitor VDB 24; and (2) provide methods used by filter driver 28 to service I/O requests. Service module 36 also determines the backup files that represent a point in time. Service module 36 uses the functions of Xblade Library 32 to service driver I/O requests.

The primary function of the Xblade Library 32 is to provide I/O address translation and performing the I/O. As such, the addressing of the MDF/NDF/LDF files via the file byte offset and length will be translated to the equivalent location in the backup files. Translation is necessary because the data and log files stored on backup file 22 are not in a format (i.e., persisted structure) which can be directly interpreted by database server 16. As previously mentioned, database server 16 is a Microsoft® SQL Server™. As with any database management system, such as SQL Server™, there is a persisted on-disk structure which corresponds to that system only. Therefore, XBlade 32 must translate (i.e., remap) the compressed data and log files from the backup file on server 22 into a format which can be read by server 16. In this exemplary embodiment, the translation is performed using the Microsoft SQL 2005 On-disk Data Structures documentation, which can be obtained from the Microsoft Corporation of Redmond, Wash. In the exemplary embodiment of FIG. 3, the persisted data structure information is located in Xblade library 32 which communicates with filter driver 28. Those ordinarily skilled in the art having the benefit of this disclosure realize how such a translation would be made, and that other data-structure specifications could also be utilized to conduct translations for their corresponding DBMSs, such as Oracle based systems.

A full backup contains data pages and log records for any data activity during the backup. The backup is mapped for rapid access and subsequent searching. XBlade library 32 also generates a cache files 18a,20a (FIG. 2) for each of the data and log files, respectively. The cache files are basically empty, and only contain pages that have been modified during the database recovery process. In addition, the header page is manufactured so that database server 16 thinks that the backup is actually a database file. During the recovery process, server 16 starts updating the data pages' based on the contents of log file 20. When SQL server 16 does decide to write out the changes to the data pages, the writes are intercepted and re-routed to the cache files. These changes are saved in the log cache file 20a and data cache file 18a when committed.

The offset and buffer length of the read request is utilized during processing of the read/write requests. The offset and the buffer length is used to determine where the data exists, which could exist in cache files 18a,20a (because of a previous write) or in the backup file 22. If the data exists in cache files 18a,20a, it is read and preferentially returned to the caller in place of being sourced from backup file 22. If the data does not exist in cache files 18a,20a, the data is sourced from backup file 22.

The write request is always written to cache files 18a,20a. The backup file on server 22 is never modified. The write request contains the offset, buffer length and buffer; the buffer is written to the cache file. Subsequent reads of this specific data is done from the cache file and not from the backup file. Typical writes occur during the database recovery processing and also during the subsequent execution of TSQL statements which insert, update or delete any data.

Other I/O requests are primarily set and query file information. These calls are directed at the Sparse File using standard Windows functions as understood in the art.

Figure 4:
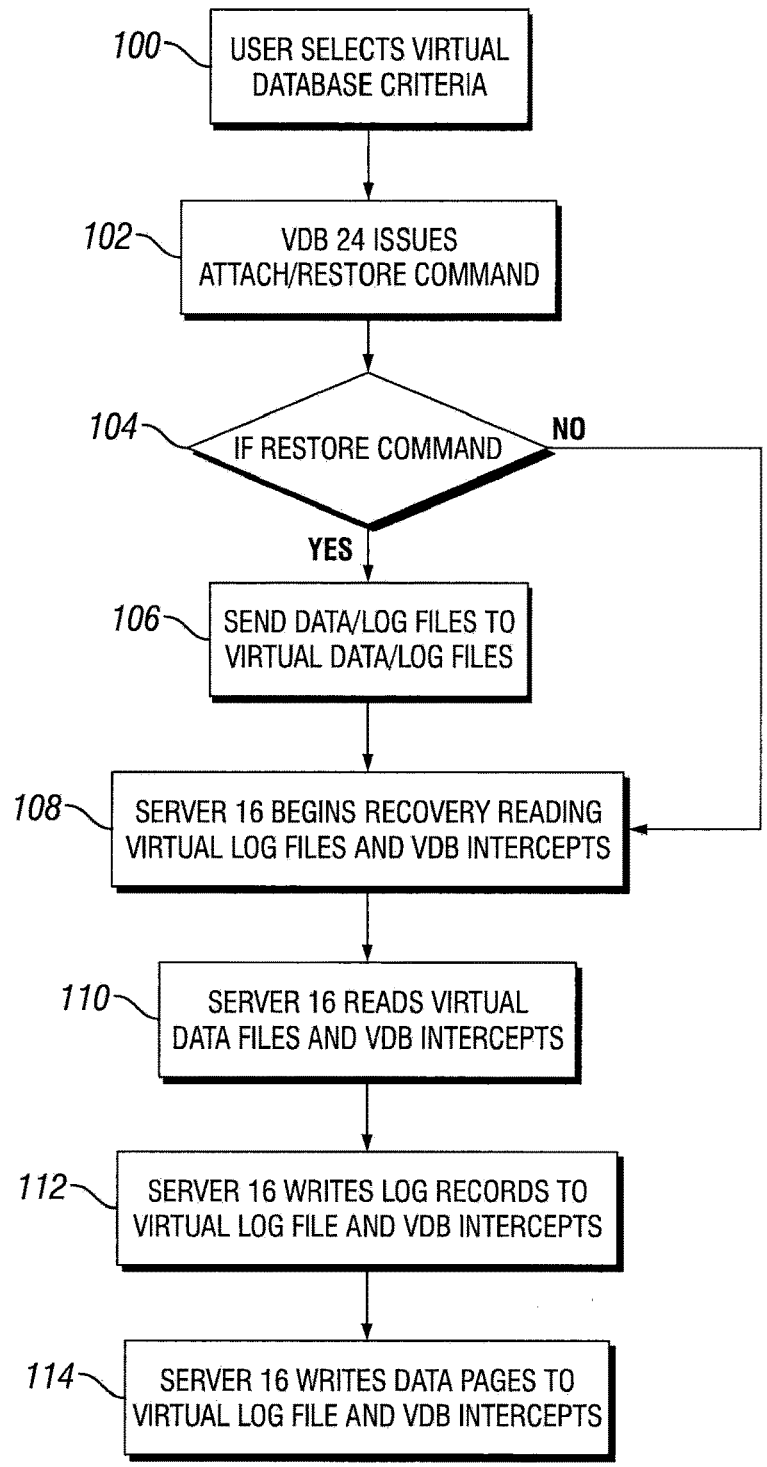
FIG. 4 is a data-flow chart illustrating the steps of a computer implementing an exemplary methodology of the present invention whereby a virtual database is created.

In reference to FIG. 4, a method of creating a new virtual database on server 16 will now be described according to an exemplary methodology of the present invention. At step 100, user 12 selects a series of criteria for the virtual database, including a database name, backup file, PIT, and target instance, via console 34. At step 102, service module 36 of VDB 24 then issues an Attach/Restore command to server 16, thereby supplying the virtual (i.e., imaginary) data/log file names selected by user 12. At step 104, VDB 24 determines whether an Attach or Restore command was selected.

If the Restore command was selected, server 16 copies the data/log files from backup file 22 and sends them to the virtual data/log files at step 106. These read from the backup file 22 are intercepted by the invention and fabricated data is returned to server 16. After a few reads of this fabricated data, server 16 thinks it has completed the coy phase of recovery.

Thereafter, at step 108, server 16 then begins the recovery where server 16 initiates a read of the log records from the virtual log files in order to perform the recovery. However, VDB software 24 intercepts this read and sources the request from backup file 22 instead. At step 104, if the Attach command is given instead of the Recovery command, step 106 is skipped and step 108 is initiated.

At step 110, server 16 then initiates a read of the virtual data pages, where VDB software 24 again intercepts the read request and sources it from backup file 22 instead. As part of the continuing recovery at step 112, server 16 then initiates a write of the log records contained in the virtual log file. However, VDB software 24 again intercepts this write and, instead, performs the write to log cache file 20a. At step 114, server 16 then initiates a write of the data pages (containing the changed data) to the virtual data file. However, VDB software 24 intercepts this write and, instead, writes the data pages to data cache file 18a. Accordingly, the virtual database recovery is complete and server 16 makes the virtual database available for use. Also note that, at this point, log cache file 20a and data cache file 18a only contain the data which server 16 needed to change during recovery. All remaining data/log files remain in backup file 22.

Figure 5:
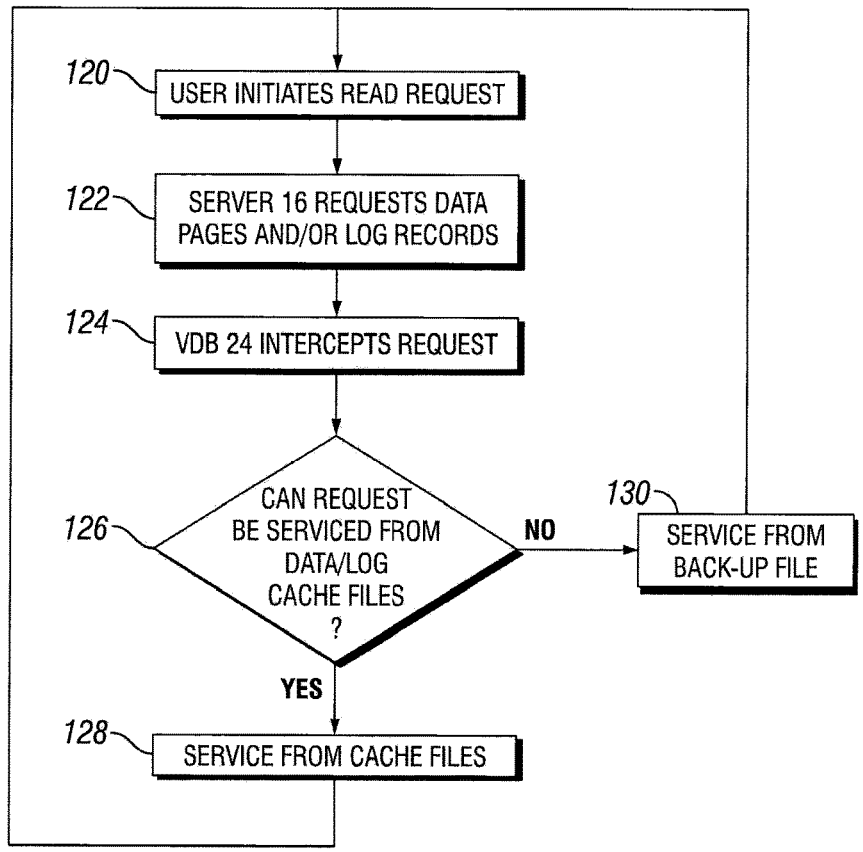
FIG. 5 is a data-flow chart illustrating the steps taken when a read request is initiated according to an exemplary methodology of the present invention.

Now that the virtual database is created/attached, its operation will be described in relation to the exemplary methodology of FIG. 5 when a user initiates a read request. At step 120, user 12 initiates a read request (TSQL statement) to server 16. At step 122, in order to service the request, server 16 then requests data pages and/or log records from the virtual files, as previously described. At step 124, VDB software 24 then intercepts the read request to the virtual files. At step 126, VDB software 24 determines whether the request can be serviced from the data/log cache files 18a,20a. If the request can be serviced from the cache files, they are serviced at step 128. If the requests cannot be serviced from the cache files, they are serviced from backup file 22 at step 130. The user may then initiate further read requests as desired.

Figure 6:
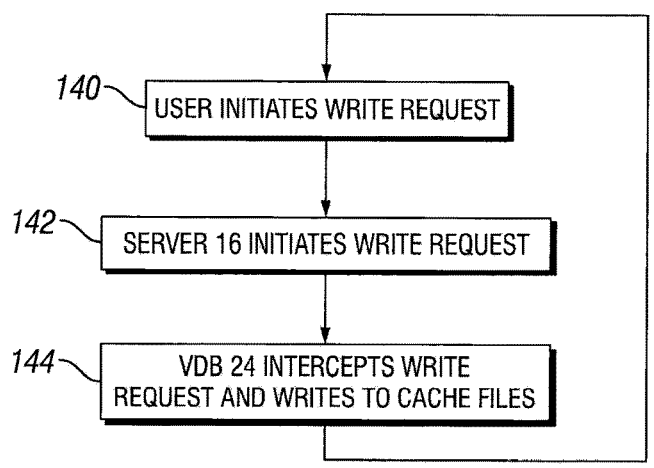
FIG. 6 is a data-flow chart illustrating the steps taken when a write request is initiated according to an exemplary methodology of the present invention.

Operation of a write request will now be described in relation to the exemplary methodology of FIG. 6. At step 140, user 12 initiates a write request (TSQL statement) via console 34. At step 142, in order to service the request, server 16 initiates a write of the data pages and log records to their respective virtual files. At step 144, VDB software intercepts the write requests and re-routes them to the data/log cache files 18a,20a. The user may then initiate further write requests as desired.

Figure 7:
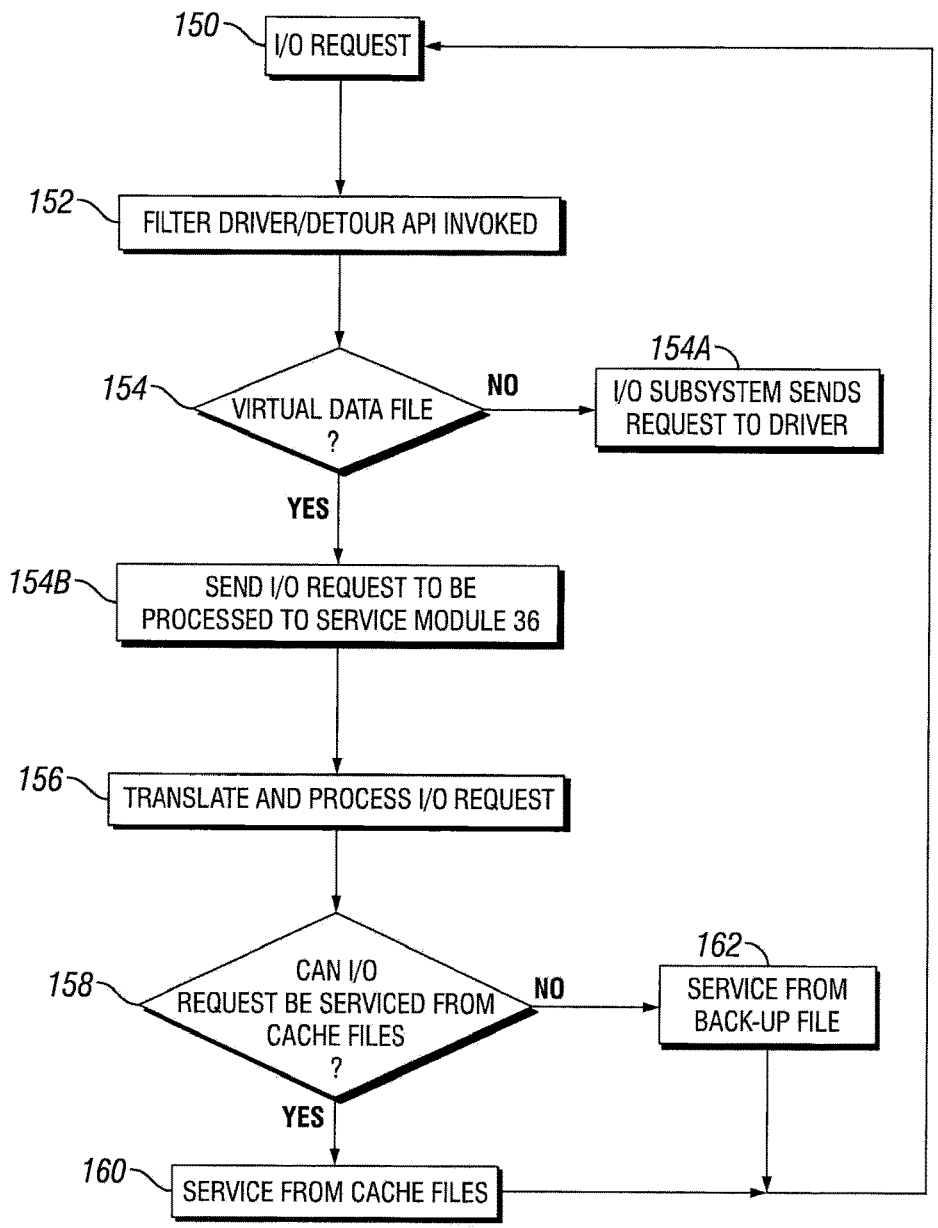
FIG. 7 is a lower level data-flow chart illustrating the steps taken when an I/O request is initiated according to an exemplary methodology of the present invention.

Lower level operation of the present invention will now be described in relation to the exemplary methodology of FIG. 7 and exemplary embodiment of. FIG. 3. When Windows I/O sub-system 30 gets an I/O request for one of the registered operations at step 150, the filter driver callback is invoked (i.e. intercepts the request) at step 152. As previously mentioned, methods of interception are well known in the art. The callback of filter driver 28 examines the file extension to determine if the file is a virtual database file at step 154. The file extension includes data such as, for example, the database name, data/log file location, etc. If the file is not a virtual database file, the callback returns and the I/O sub-system 30 sends the request to the device driver for completion at step 154a. If the file is a virtual database file, filter driver 28 directs the I/O request to service module 36 at step 154b. Service module 36 then directs Xblade Library 32 to translate and process the I/O request at step 156, and send the result back to the filter driver 28.

At step 158, VDB software 24 then determines whether the I/O request can be serviced to/from cache files 18a,20a. If the I/O request can be serviced to/from the cache files 18a,20a, the I/O request is serviced accordingly at step 160. However, if VDB software 24 determines the I/O request cannot be serviced to/from cache files 18a,20a, it is instead serviced from backup file on server 22 at step 162. Therefore, this exemplary methodology applies to any I/O request issued against the virtual data files such as, for example, create, read, write, or close. The methodology enables the servicing of I/O requests from what server 16 believes are the physical data file 18 and log file 20 to be serviced instead from the data cache file 18a and log cache file 20a. When such data blocks cannot be located on either cache files, the I/O requests are sourced from the backup file 22 as a last resort. The backup files are located on backup file 22; however they may also be located on a local drive.

Technical Implementation of Exemplary Embodiments:

Based upon the foregoing, embodiments of the present invention produce a virtual database via a set of virtual data files. These virtual data files are used by a database management system ("DBMS") of database server 16 to access normal data files in a file system within a specific OS context. From the DBMS user's perspective, virtual data file names are used in lieu of real data file names within server commands executed through a DBMS client connection. Firstly, the user determines which database is to be mounted/attached as a virtual database. This source database is uniquely specified by its database name, DBMS instance name, and machine name. Secondly, the user determines which Point-In-Time ("PIT") is to be used for the virtual database, given the available time line supported by the available backups for the chosen database.

Embodiments of the present invention further allow for registering the directories containing the interesting backups to be monitored for automatic time line construction for all source databases found in the backups contained in those directories. This registration allows for an automatic mount of a virtual database simply by encoding these source database key values into the virtual data file name. For example, to attach the "Northwind" Database from the "Texas\SS2000" DBMS Instance from New Year's day at 2:00 pm, execute the following command:

```
CREATE DATABASE Northwind_2009_01_01_14_00
ON ( FILENAME =
  'C:\PIT=Texas!SS2000!Northwind!StopAt=2009-01-01 14-00-00.mxf')
FOR ATTACH
```

Or, for example, to attach the "AdventureWorks" Database on "Texas\SS2005" before a particular LSN, execute the following command:

```
CREATE DATABASE AdventureWorks_LSN_34_16_2
ON ( FILENAME =
  'C:\PIT=Texas!SS2005!AdventureWorks!StopBefore-
  LSN=34-16-2.mxf')
FOR ATTACH
```

The user can detach the virtual databases by executing the following command. The Virtual Database is not unmounted in this case, and the user can subsequently reattach it using one of the previous ATTACH commands.

```
EXECUTE sp_detach_db 'Northwind_2009_01_01_14_00'
EXECUTE sp_detach_db 'AdventureWorks_LSN_34_16_2'
```

Once all work is completed using the virtual databases, the user would execute the following commands:

```
DROP DATABASE Northwind_2009_01_01_14_00
DROP DATABASE AdventureWorks_LSN_34_16_2
```

Alternatively, the user can execute a virtual database MOUNT command to perform an explicit Mount and ATTACH/Restore of a virtual database. This allows the user to specify backup files and the PIT as parameters to an extended stored procedure or CLI executable. The PIT parameter is in the format of the SQL WITH STOP clauses of the SQL RESTORE command. Also, an alternative to executing the "DROP DATABASE" command, is to execute the virtual database UNMOUNT command which will first DETACH and then unmount the virtual database.

The ATTACH command is executed by the DBMS Engine as a sequence of file I/O Application Programming Interface ("API") function calls to perform proper bootstrapping and recovery, and subsequent database activity if the database is not placed in read-only mode. The DBMS will first call the CreateFile( ) function to open the virtual data files. On first reference by CreateFile( ) to a Data File encoded with a unique source database and PIT, the virtual database will be automatically mounted if not already by a previous execution of the MOUNT command, and a HANDLE is returned. The DBMS will perform several ReadFile( ) and WriteFile( ) operations on the virtual data files using this HANDLE.

The DROP DATABASE command is executed by the DBMS Engine by first calling WriteFile( ) to update boot-strapping information, and then calls CloseHandle( ) to complete I/O operations with all Virtual Data Files for the particular virtual database, and then executes DeleteFile( ) for each. Once the very last data file is deleted, the virtual database is automatically unmounted and its resources are freed.

The present invention must interface with the DBMS so that it can interact with it and present its virtual image of the file to the DBMS. As such, the present invention is concerned with the Input/Output capabilities provided to the DBMS for access to/from the Virtual Data Files. As discussed herein, the present invention accomplishes this interface via the use of a Mini-filter Device Driver 28 (FIG. 3) in combination with a Service module 36 and X Blade Library 32 (FIG. 3) to process the file-system I/O requests. However, those ordinarily skilled in the art having the benefit of this disclosure realize there are other possible ways to implement such an interface. For example, API Detouring within the DBMS executable may be used. In this exemplary embodiment, the interface is at the Windows File I/O API level. In Windows, this is CreateFile( ), ReadFile( ), WriteFile( ), ReadScatter( ), WriteGather( ), GetOverlappedResult( ), CloseHandle( ), DeleteFile( ), etc. Also, one may re-vector the DLL export information within the DBMS executable, in lieu of the OS, for the File I/O API. Moreover, a self-contained device driver may also be utilized to process the file-system I/O requests.

Concerning all of the methods mentioned above to interface to the DBMS, embodiments of the present invention are implemented using a library of functions which model the File I/O API of the OS with a few additional functions provided for administration and/or reporting purposes. When interfacing to the DBMS executable, the present invention's API is simply called in lieu of the OS API for references to virtual files. When interfacing at the device-driver level, the API is called to fulfill the I/O requests originating from the OS involving the virtual files. So it is at this File I/O API level in which the present invention is herein described and implemented.

A number of functions are utilized within the API. First, there is the CreateFile function. Using the Full Pathname of a Virtual Data File, this function in general serves two purposes: to open an existing file, or to create and open a new file. The first time a Virtual Data File is opened via the CreateFile function, a disk-based write-buffer cache, the cache file, is newly created and populated with data fabricated by the present invention. A successful call to CreateFile opens this disk-based cache file (henceforth Virtual Cache File) and returns this HANDLE for further I/O to the opened Virtual Data File. The cache file names have the extensions MCF, NCF, and LCF, with file names like their corresponding MXF, NXF, and LXF Virtual Data Files. Also, using the Full Pathname, the present invention uniquely identifies the Virtual Database in which this Virtual Data File belongs, and associates the HANDLE to the appropriate FileId for that database file. This unique identification allows for either the lookup of a previously mounted Virtual Database, or the automatic mounting of a new Virtual Database.

Using the CreateFile function, the logical size of the data files is determined. The MXF and NXF files are created with the maximum size specified in the Configuration Information of the Backups in the Backup Chain. More specifically, it is the cache files that are created with this size. The LXF VCFs are created with a different VLF layout from their corresponding LDF files. The layout is based on the LLS and the LLFs are stored sequentially in corresponding VLFs.

The Growth & Allocation Page is initialized using the CreateFile function. If a Virtual Data File grows during the time spanned by the LLS, this growth area will require some fabrication when dealing with allocation Pages. The PFS Pages occurring every 8088 Pages that reside in the growth area will be fabricated. Also, the GAM Pages occurring in the GAM Interval, every 511232 Pages, will also possibly need fabrication. This will require the processing of the LLS to gather the appropriate LSN Page-stamps for these Allocation Pages to allow RECOVERY to execute without aborting.

The data in the data files is fabricated using the CreateFile function. Every MXF and NXF Data File contains a first Page, the File Header Page (File Header Page (*:0)), which contains one Record defined by the GlobalFileHeader (GFH) structure. A fabricated Page is produces by modifying the existing Page 0 found in the backups. The fields of interest are GFH.Size and GFH.BindingID. Only the MXF has a Boot Page (Boot Page (1:9)). It contains one Record defined by the DBINFO structure. The fields of interest are:

(1) DBINFO.dbi__checkptLSN;
(2) DBINFO.dbi__recoveryForkNameStack.m__stack[0].m__lsn; and
(3) DBINFO.dbi__recoveryForkNameStack.m__stack[0].m__guid.

The MXF contains all of the sysfiles1 Pages (Sysfiles1 Pages (1:32, . . . )). The doubly-linked linked-list of sysfiles1 starts at Page 32. There is one Record describing each Data File. Each of these Records is modified to use the unique name encoding that references Virtual Data Files, instead of the Database's existing physical Data File names.

There may also be pages not represented in any backup file. Thus, during a read operation, if a Page is not found in either the Diff Backup or Full Backup, then a Zero Page is fabricated to complete the operation for that region of the read buffer. The CreateFile function is also utilized to fabricate LDF Data. Every LXF Data File contains a first Page, the File Header Page (File Header Page (*:0)), which contains two Records. The first is defined by the GlobalFileHeader (GFH) structure. The second Record exactly matches that Record of the Boot Page. A fabricated Page is produced by modifying the existing Page 1:0 of the MXF found in the Backups because the LXF File Header Pages are not stored in the Backup.

Regarding Virtual Log File Headers, the physical layout follows the LLS sequence versus the original layout existing for the Database. Regarding Final Log Block, If a STOP PIT is specified, the final Log Block will be read from the Backup and modified such that all undesired Log Records with LSN greater than or equal to the STOP PIT will be modified and written to the cache log file as LOG NO-Ops, or using some other technique causing the effect of truncating the Log Block. Lastly, regarding non-existent Log Blocks not found on the backup file—during a read operation, if a Log Block Sector is not found in any of the Backups in the Backup Chain, then Zero sectors or flipped-parity sectors are fabricated to complete the operation for that region of the read buffer.

The second function contained within the present inventions API is the ReadFile function. Using the HANDLE to a Virtual Data File, this function reads a specified number of bytes from a given offset in the file into a buffer pointed to by the specified address. The present invention accomplishes the read operation by first performing the identical single read operation to the cache file. This ensures that the data returned in the buffer contains any fabricated data which was written during initialization, or any modified data which was previously written by the DBMS. The portions of the buffer that were not populated from the read of the cache file, are populated by one or more read operations to one or more Backup Files.

As part of the first phase of the read operation, the mirror read from the cache file is performed. I/O operations to data files are performed with a granularity and alignment of 8192 bytes, the size of one Page, and the operations to the LDFs are performed with a granularity and alignment of 512 bytes, the size of one Sector.

Embodiments of the present invention detect regions of the buffer which are either unallocated or all-zero data within the cache file in order to subsequently populate these regions with data from the backup files. This is accomplished by first assuming the entire buffer is unallocated, then iteratively correcting this view with information about allocated regions gathered from the OS regarding the File fragments involved in this region of the file being read. Them the final step is to iteratively correct the view of the allocated regions by detecting the Zero Pages or Zero Sectors found in the buffer and marking these as unallocated regions. Actually, the detections of the all-zeroes condition can be restricted to read just one or a few bytes instead of the entire 8192 or 512. For Pages, if the 96-byte Page header is zero that is sufficient enough to assume the entire page is all zero, or even just the m_version field (one byte) since it must have a value 0x01. For Log Block Sectors, just the first byte being zero is sufficient since it must contain a parity-byte with either the 0x40 or 0x80 bit set.

During the MOUNT of a Virtual Database, regions within the LXFs are defined to allow for proper regions within the read buffer to be processed correctly. Read operations to the File Header Page, Virtual Log File Headers, and Log Block areas (both used and unused) are treated differently. A subset of LXF regions will take part in any particular read operation. The regions of PXFs are implicitly laid out as alternating regions of existing (in the Diff/Full Backup) and non-existing Page Extents.

I/O address translation for PXFs is accomplished by finding the FileId for the HANDLE being used, and constructing a PageId with the following simple formula: PageId={FileId, Offset/8192}. This PageId is then used to first attempt obtaining the Page from a Diff Backup if present, and secondly to attempt to obtain the Page from the Full Backup. If successful, the Page is read directly from the relevant Backup into its location within the buffer.

I/O address translation for LXFs is accomplished first by finding the appropriate LXF regions, defined previously by the MOUNT, given the read offset and read length. The Log Block regions of this subset each point to the corresponding MSTL:MQTL data streams within a Backup for that portion of its LLF stored there. There can be several Log Block regions with one LLF that reference differing Log Backups, or one Log Backup could contain several LLFs. Each VLF is represented in the Backup with a corresponding MSTL, and if the VLF contains a portion of an LLF, the Backup will have an MSTL:MQTL. These data streams are stored in 64 KB striped chunks, and when reading from a Compressed Backup, the data can be scattered across multiple compressed blocks. As such, the present invention iteratively reads as many sectors as possible from the appropriate 64 KB striped chunks moving in a round-robin fashion between the Striped Backup Files. So for Compressed Backups more iterations might be required. The set of formulas to calculate the starting and subsequent positions involves arithmetic involving modulo, division, and multiplication by 65536, and modulo by the number of stripes.

The third function contained within the present inventions API is the WriteFile function. Using the HANDLE to a Virtual Data File, this function writes a specified number of bytes to a given offset in the file from a buffer pointed to by the specified address. The present invention accomplishes the write operation by performing the identical single write operation to the cache file.

There are different ways to implement cache file. First, as in the exemplary embodiments of the present invention, the cache file can be implemented using Sparse Files. This lets the OS handle the difficult tasks regarding fragmentation and physical address translation. The second exemplary implementation is accomplished using a disk-based cache. This is a first-come first-serve cache with dictionary sections defining a mapping of the used regions within intervals of the disk-cache file. When using Sparse Files the write operations are simplified, and the implementation is simply a pass-through write operation.

The fourth function contained within the present inventions API is the CloseHandle function. Using the HANDLE to a Virtual Data File, this function closes the cache file, and marks the Virtual Data File in a closed state ready for a subsequent CreateFile to reopen if desired.

The fifth function contained within the present inventions API is the DeleteFile function. Using the Full Pathname of a Virtual Data File, this function deletes the cache file and frees the resources held by the Virtual Data File.

The sixth function contained within the present inventions API is the Mount function. Given a set of backups representing a particular Backup Chain and a PIT STOP specification, the present invention prepares the mapping of the backup files for subsequent I/O address translation, builds the LLS sequence of LLFs, which also verifies a proper Backup chain sequence and Stop PIT, then creates a virtual database object. After a successful mount, the Virtual Database is ready for the DBMS ATTACH/RESTORE command to bring it online. This MOUNT function can be called implicitly from the CreateFile function when performing an AUTO-MOUNT. The Virtual Database can be found by CreateFile and DeleteFile using the unique name, and by other File I/O API functions using the unique HANDLE supplied by CreateFile.

There are also a number of miscellaneous functions utilized within the API. The ReadFileScatter function allows for one contiguous region on disk to be read into a list of buffers. The WriteFileGather function allows for one contiguous region on disk to be written from a list of buffers. The GetOverlappedResult function allows for asynchronous I/O. The GetFileAttributes function returns hard-coded attributes indicating a normal disk file even though the underlying Cache File may indeed be a Sparse file. The FlushFileBuffers function operates directly on the Sparse File.

As discussed herein, a Virtual Database may be attached from a Full Backup. This is the basic operation, but has one limitation; a STOP PIT cannot be specified for a simple "CREATE DATABASE . . . FOR ATTACH" command, since it requires first the roll-forward to the MinRedoLSN. Actually, this limitation is present even if a Log Backup is specified. However, the STOP PIT feature could potentially be implemented using multiple steps invoking the RESTORE command. In this case, the LXF images contain only the portion of Log Blocks found in the Full Backup.

A Virtual Database may also be attached from a Full Backup and a Differential Backup. Exemplary embodiments of the present invention handle VO requests for data files from the backup file data by first attempting to read the Page from the Diff Backup. If this is unsuccessful, it then attempts to read the same Page from the Full Backup. In this way Pages existing in a Diff Backup overlay those same Pages in the Full Backup. Also, the portion of the LLS which represents the duration of the Full Backup is ignored, because it is the one from the Diff Backup that is appropriate concerning roll-forward of the Differential Pages. All Pages modified during the Full Backup are marked to be present in any subsequent Diff Backup because one of the first steps of the Backup is clearing the dirty bits concerning these Pages, and hence these Pages are also up-to-date to the CheckpointLSN of the Diff Backup.

A Virtual Database may also be attached with Log Backups. Basically, this operation is the same as when not using Log Backups with a few exceptions. The LLS is extended in length for each Log Backup involved, and hence the LXF images grow larger from a logical point of view. However, the LCFs are almost completely empty. Embodiments of the present invention ensure their exists some extra VLFs within the LXF image for room for the DBMS to write its continuing LLS stream into the VLFs, which prevents the DBMS from performing the lengthy growth process on LXFs.

The reason why the LXF image is based on a sequential view of the LLS and not the original format is due in part to 2 major considerations. First, VLFs are recycled and, hence, given a lengthy Log Backup Chain, causing a problem because a single VLF cannot contain 2 separate LLFs. Second, the Phase 0 of RECOVERY which scans the Log Blocks has some unknown expectations concerning the order of LLFs within the VLFs causing it to prematurely quit scanning. It draws a line in the sand and begins to write new Log Blocks when it reaches the premature end. As such, the present invention bases the LXF image on a sequential view of the LLS instead of the original format.

In view of the foregoing, embodiments of the present invention provide a computer system for creating a virtual database, the computer system comprising: a mechanism configured to detect an input/output ("I/O") request to a log file of a database; a mechanism configured to intercept the I/O request; a mechanism configured to translate the intercepted I/O request, the translation comprising mapping the I/O request to a log file portion of a backup file; and a mechanism configured to update a cache file using the log file portion of the backup file, thereby creating the virtual database. In the alternative, the computer system is configured to service subsequent I/O requests directly from the virtual database in response to structured query language commands. In another exemplary embodiment, the mechanism configured to translate the intercepted I/O request is also configured to: perform a call using the translated I/O request; and receive a recovery requirement in response to the call, wherein the mechanism configured to update the database performs the update in response to the recovery requirement. In yet another exemplary embodiment, the mechanism configured to intercept the I/O request only intercepts the I/O request if it is determined that a file extension of the I/O request to the log file of the database corresponds to the virtual database.

Another exemplary embodiment of the present invention provides a computer system for creating a virtual database, the computer system comprising: a mechanism configured to perform a call based upon an input/output ("I/O") request from a database management system; a mechanism configured to intercept the I/O request; a mechanism configured to translate the I/O request; a mechanism configured to perform a call based upon the translated request; a mechanism configured to receive a recovery requirement; a mechanism configured to conduct a recovery using log files read from a backup file, the database management system being unaware the log files are being sourced from the backup file; and a mechanism configured to create the virtual database in response to the recovery.

Another exemplary embodiment of the present invention provides a computer system for creating a virtual database, the computer system comprising: a mechanism configured to receive a recovery requirement for a database server; and a mechanism configured to recover the database server using log files sourced from a backup file, thereby creating a virtual database.

Yet another exemplary embodiment of the present invention provides a computer system for creating a virtual database, the computer system comprising: a mechanism configured to receive an input/output ("I/O") request for a log file of a database; and a mechanism configured to service the I/O request from a log file portion of a backup file instead of the database, thereby creating the virtual database.

An exemplary methodology of the present invention provides a computer implemented method for creating a virtual database, the method comprising the steps of: (a) detecting an input/output ("I/O") request to a log file of a database; (b) intercepting the I/O request; (c) translating the intercepted I/O request, the translation comprising the step of mapping the I/O request to a log file portion of a backup file; and (d) updating a cache file using the log file portion of the backup file, thereby creating the virtual database. In an alternate methodology, the method further comprises the step of servicing subsequent I/O requests directly from the virtual database in response to structured query language commands. In yet another exemplary methodology, step (c) further comprises the steps of: performing a call using the translated I/O request; and receiving a recovery requirement in response to the call, wherein step (d) is performed in response to the recovery requirement. In another methodology, step (b) is only performed if it is determined that a file extension of the I/O request to the log file of the database corresponds to the virtual database.

Another exemplary methodology of the present invention provides a computer implemented method for creating a virtual database, the method comprising the steps of: (a) performing a call based upon an input/output ("I/O") request from a database management system; (b) intercepting the I/O request; (c) translating the I/O request; (d) performing a call based upon the translated request; (e) receiving a recovery requirement; (f) conducting a recovery using log files read from a backup file, the database management system being unaware the log files are being sourced from the backup file; and (g) creating the virtual database in response to the recovery.

Another exemplary methodology of the present invention provides a computer implemented method for creating a virtual database, the method comprising the steps of (a) receiving a recovery requirement for a database server; (b)

recovering the database server using log files sourced from a backup file; and (c) creating the virtual database in response to the database recovery.

Another exemplary methodology of the present invention provides a computer implemented method for creating a virtual database, the method comprising the steps of: (a) receiving an input/output ("I/O") request for a log file of a database; and (b) servicing the I/O request from a log file portion of a backup file instead of the database, thereby creating the virtual database.

Yet another exemplary embodiment of the present invention provides a computer program product which stores, on a computer-readable medium, instructions for execution on a computer system, which when executed by the computer system, causes the computer system to perform the steps of: (a) detecting an input/output ("I/O") request to a log file of a database; (b) intercepting the I/O request; (c) translating the intercepted I/O request, the translation comprising the step of mapping the I/O request to a log file portion of a backup file; and (d) updating a cache file using the log file portion of the backup file, thereby creating the virtual database. In another methodology, the computer program product further causes the computer system to perform the step of servicing subsequent I/O requests directly from the virtual database in response to structured query language commands. In yet another methodology, step (c) further comprises the steps of: performing a call using the translated I/O request; and receiving a recovery requirement in response to the call, wherein step (d) is performed in response to the recovery requirement.

Another exemplary embodiment of the present invention provides a computer program product which stores, on a computer-readable medium instructions for execution on a computer system, which when executed by the computer system, causes the computer system to perform the steps of: (a) performing a call based upon an input/output ("I/O") request from a database management system; (b) intercepting the I/O request; (c) translating the I/O request; (d) performing a call based upon the translated request; (e) receiving a recovery requirement; (f) conducting a recovery using log files read from a backup file, the database management system being unaware the log files are being sourced from the backup file; and (g) creating the virtual database in response to the recovery.

Another exemplary embodiment of the present invention provides a computer program product which stores, on a computer-readable medium, instructions for execution on a computer system, which when executed by the computer system, causes the computer system to perform the steps of: (a) receiving a recovery requirement for a database server; (b) recovering the database server using log files sourced from a backup file; and (c) creating the virtual database in response to the database recovery.

Yet another exemplary embodiment of the present invention provides a computer program product which stores, on a computer-readable medium, instructions for execution on a computer system, which when executed by the computer system, causes the computer system to perform the steps of: (a) receiving an input/output ("I/O") request for a log file of a database; and (b) servicing the I/O request from a log file portion of a backup file instead of the database, thereby creating a virtual database.

Yet another exemplary embodiment of the present invention provides a computer system for creating a virtual database, the computer system comprising: a mechanism configured to detect an input/output ("I/O") request; a mechanism configured to intercept the I/O request; a mechanism configured to translate the intercepted I/O request, the translation comprising mapping the I/O request to a log file portion of a backup file; a mechanism configured to update a cache file using the log file portion of the backup file, thereby creating the virtual database; and a mechanism configured to service the I/O request from the backup file if the I/O request cannot be first serviced from the cache file. In the alternative, the system further comprises a mechanism to save data changes to the cache file.

Another exemplary methodology of the present invention provides a computer implemented method for creating a virtual database, the method comprising the steps of: (a) detecting an input/output ("I/O") request; (b) intercepting the I/O request; (c) translating the intercepted I/O request, the translation comprising mapping the I/O request to a log file portion of a backup file; (d) updating a cache file using the log file portion of the backup file, thereby creating the virtual database; and (e) servicing the I/O request from the backup file if the I/O request cannot be first serviced from the cache file. In an alternative methodology, the method further comprises the step of saving data changes to the cache file.

Another exemplary embodiment of the present invention provides a computer program product which stores, on a computer-readable medium, instructions for execution on a computer system, which when executed by the computer system, causes the computer system to perform the steps of: (a) detecting an input/output ("I/O") request; (b) intercepting the I/O request; (c) translating the intercepted I/O request, the translation comprising mapping the I/O request to a log file portion of a backup file; (d) updating a cache file using the log file portion of the backup file, thereby creating the virtual database; and (e) servicing the I/O request from the backup file if the I/O request cannot be serviced first from the cache file. In an alternative embodiment, the computer program product further causes the computer system to perform the step of saving data changes to the cache file.

Although various embodiments and methodology have been shown and described, the invention is not so limited and will be understood to include all such modifications and variations as would be apparent to one skilled in the art. Accordingly, the invention is not to be restricted except in light of the attached claims and their equivalents.

What is claimed is:

1. A computer system for creating a virtual database mechanism, the computer system comprising:
a memory;
a processor; and
a non-transitory computer-readable storage medium storing instructions which, when executed by the processor, instantiate:
a mechanism configured to detect an input/output ("I/O") request, from a database management system comprising a database, to a first log file of the database, wherein the database includes a first data file and the first log file associated with the first data file;
a mechanism configured to intercept the I/O request;
a mechanism configured to deliver the intercepted I/O request to a cache file or, in the absence of a previous write, to a backup file, wherein the backup file includes a second log file and a second data file, wherein the second log file in the backup file is different from the first log file in the database; and
a mechanism configured to update the cache file by replacing a data portion and a log portion of the cache file with the second log file and the second data file from the backup file respectively, thereby creating the virtual database mechanism configured to maintain Transact-SQL transactional consistency by using the log portion of the cache file, wherein Transact-SQL transactional consistency is obtained by applying Transact-SQL commit and rollback operations between the log portion of the cache file and the data portion of the cache file, thereby bringing the database to a point of transactional consistency, wherein the I/O request is managed by the database management system as if the I/O request is being serviced by the database instead of the virtual database mechanism; wherein the I/O request is serviced immediately from the backup file without a restore copy phase first having to take place.

2. A computer system as defined in claim 1, wherein the computer system is configured to service subsequent I/O requests directly from the virtual database mechanism in response to structured query language commands.

3. A computer system as defined in claim 1, wherein the mechanism configured to deliver the intercepted I/O request is also configured to:
perform a call using the intercepted I/O request; and
receive a recovery requirement in response to the call, wherein the mechanism configured to update the database performs the update in response to the recovery requirement.

4. A computer system as defined in claim 1, wherein the mechanism configured to intercept the I/O request only intercepts the I/O request if it is determined that a file extension of the I/O request to the log file of the database corresponds to the virtual database mechanism.

5. A computer implemented method for creating a virtual database mechanism, the method comprising the steps of:
(a) detecting an input/output ("I/O") request, from a database management system comprising a database, to a first log file of the database, wherein the database includes a first data file and the first log file associated with the first data file;
(b) intercepting the I/O request;
(c) delivering the intercepted I/O request to a cache file or, in the absence of a previous write, to a backup file, wherein the backup file includes a second log file and a second data file, wherein the second log file in the backup file is different from the first log file in the database; and
(d) updating a cache file by replacing a data portion and a log portion of the cache file with the second log file and the second data file from the backup file respectively, thereby creating the virtual database mechanism configured to maintain Transact-SQL transactional consistency by using the log portion of the cache file, wherein Transact-SQL transactional consistency is obtained by applying Transact-SQL commit and rollback operations between the log portion of the cache file and the data portion of the cache file, thereby bringing the database to a point of transactional consistency, wherein the I/O request is managed by the database management system as if the I/O request is being serviced by the database instead of the virtual database mechanism; wherein the I/O request is serviced immediately from the backup file without a restore copy phase first having to take place.

6. A computer implemented method as defined in claim 5, the method further comprising the step of servicing subsequent I/O requests directly from the virtual database mechanism in response to structured query language commands.

7. A computer implemented method as defined in claim 5, wherein step (c) further comprises the steps of:
performing a call using the intercepted I/O request; and
receiving a recovery requirement in response to the call, wherein step (d) is performed in response to the recovery requirement.

8. A computer implemented method as defined in claim 5, wherein step (b) is only performed if it is determined that a file extension of the I/O request to the log file of the database corresponds to the virtual database mechanism.

9. A non-transitory computer-readable storage medium storing instructions for execution on a computer system, which when executed by the computer system, causes the computer system to perform the steps of:
(a) detecting an input/output ("I/O") request, from a database management system comprising a database, to a first log file of the database, wherein the database includes a first data file and the first log file associated with the first data file;
(b) intercepting the I/O request;
(c) delivering the intercepted I/O request to a cache file or, in the absence of a previous write, to a backup file, wherein the backup file includes a second log file and a second data file, wherein the second log file in the backup file is different from the first log file in the database; and
(d) updating a cache file by replacing a data portion and a log portion of the cache file with the second log file and the second data file from the backup file respectively, thereby creating a virtual database mechanism configured to maintain Transact-SQL transactional consistency by using the log portion of the cache file, wherein Transact-SQL transactional consistency is obtained by applying Transact-SQL commit and rollback operations between the log portion of the cache file and the data portion of the cache file, thereby bringing the database to a point of transactional consistency, wherein the I/O request is managed by the database management system as if the I/O request is being serviced by the database instead of the virtual database mechanism; wherein the I/O request is serviced immediately from the backup file without a restore copy phase first having to take place.

10. A non-transitory computer-readable storage medium as defined in claim 9, further causing the computer system to perform the step of servicing subsequent I/O requests directly from the virtual database mechanism from the backup file in response to structured query language commands.

11. A computer program product as defined in claim 9, wherein step (c) further comprises the steps of:
performing a call using the intercepted I/O request; and
receiving a recovery requirement in response to the call, wherein step (d) is performed in response to the recovery requirement.

* * * * *